United States Patent [19]
McKenzie

[11] Patent Number: 4,809,751
[45] Date of Patent: Mar. 7, 1989

[54] PRESSURE TEST CAP

[75] Inventor: Robert D. McKenzie, East Hartford, Conn.

[73] Assignee: United Technologies Corporation, Hartford, Conn.

[21] Appl. No.: 161,709

[22] Filed: Feb. 29, 1988

[51] Int. Cl.[4] ............................................. F16L 55/10
[52] U.S. Cl. ....................................... 138/89; 138/90; 73/49.8
[58] Field of Search .......................... 136/89, 90, 96 R; 73/49.8

[56] References Cited

U.S. PATENT DOCUMENTS

| | | | |
|---|---|---|---|
| 759,081 | 5/1904 | Delehanty | 138/89 |
| 1,176,463 | 3/1916 | Kimmel | 138/90 |
| 2,329,801 | 9/1943 | Wellborn | 138/89 |
| 2,375,995 | 5/1945 | Kaeser | 138/89 |
| 2,512,041 | 6/1950 | Steele | 138/89 |
| 2,662,663 | 12/1953 | Schmidt et al. | 138/90 |
| 2,886,067 | 5/1959 | Maxwell et al. | 138/90 |
| 3,618,811 | 11/1971 | Martine | 138/89 |
| 3,886,977 | 6/1975 | Dorgebray | 138/89 |
| 4,381,800 | 5/1983 | Leslie | 138/90 |
| 4,611,485 | 9/1986 | Leslie | 138/90 |

Primary Examiner—James E. Bryant, III
Attorney, Agent, or Firm—Lloyd D. Doigan

[57] ABSTRACT

A pressure test cap is provided which positively seals a duct, having a shaped end portion, of a component in preparation for a pressure or leaking test thereof. The test cap has: a sealing cap for enclosing the shaped end portion of the duct, the sealing cap having a portion conforming to the shape of the shaped end portion of the duct; an expansible collet for disposal within the shaped end portion of the duct, the collet having an outer surface conforming with the shape of the shaped end portion of the duct; and an actuator which extends through the sealing cap and engages the collet, expanding the collet radially outwardly so that the shaped end portion of the duct is engaged between the outer surface of the collet and the portion of the sealing cap so that the duct is sealed by said sealing cap, and for contracting the collet radially inwardly so that the sealing cap and the expansible collet may be either removed or mounted upon the duct as may be required.

13 Claims, 1 Drawing Sheet

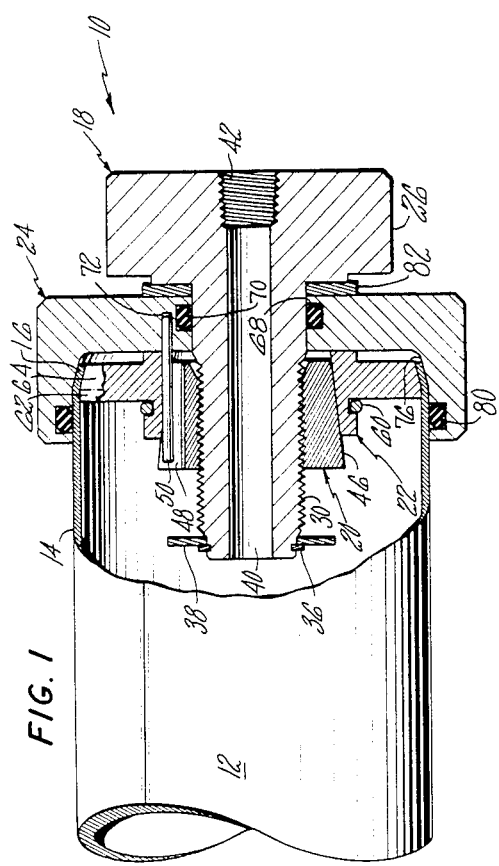
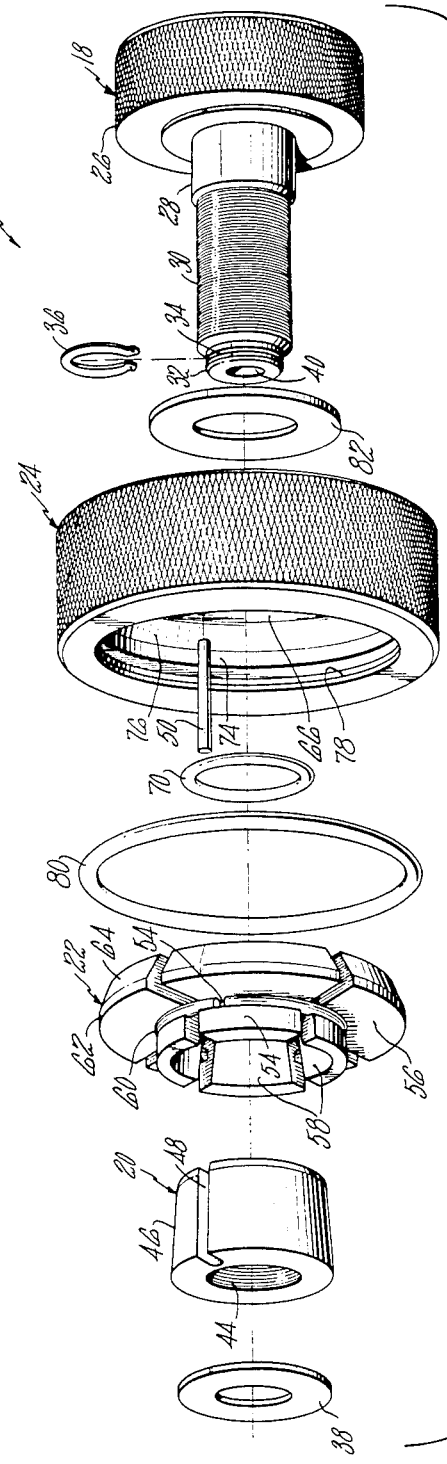

PRESSURE TEST CAP

TECHNICAL FIELD

This invention relates to a test cap for the pressure testing of an environmental system component.

BACKGROUND ART

Environmental control systems typically have a plurality of components connected by ducts. Occasionally, some of those components, such as heat exchangers, must be pressure or leakage tested to ensure their operational integrity. In order to pressure or leakage test a component, the input and output ducts of the component must be sealed off. Some input and output ducts, however, lack a positive means of attachment, such as a flange or bead, to attach a seal to those ducts. Because such component ducts lack a positive means of attachment, it is difficult to seal the component duct before pressure or leakage testing.

DISCLOSURE OF INVENTION

It is an object of the invention to provide a means for sealing the ducts of a component for pressure or leakage testing even though the duct of that component may not have a positive means of attachment.

According to the invention, a pressure test cap is provided which positively seals a duct, having a shaped end portion, of a component in preparation for a pressure or leaking test thereof. The test cap has: a sealing cap for enclosing the shaped end portion of the duct, the sealing cap having a portion conforming to the shape of the shaped end portion of the duct; an expansible collet for disposal within the shaped end portion of the duct, the collet having an outer surface conforming with the shape of the shaped end portion of the duct; and an actuator which extends through the sealing cap and engages the collet, expanding the collet radially outwardly so that the shaped end portion of the duct is engaged between the outer surface of the collet and the portion of the sealing cap so that the duct is sealed by said sealing cap, and for contracting the collet radially inwardly so that the sealing cap and the expansible collet may be either removed or mounted upon the duct as may be required.

According to a feature of the invention, the screw is provided with a hollow interior for communicating a test fluid into the duct for testing.

These and other objects, features and advantages of the present invention will become more apparent in light of the detailed description of a best mode embodiment thereof, as illustrated in the accompanying drawing.

BRIEF DESCRIPTION OF DRAWING

FIG. 1 is a view, partially in section, of an embodiment of the pressure test cap of the invention; and FIG. 2 is an exploded perspective view of the construction of the pressure test cap of FIG. 1.

BEST MODE FOR CARRYING OUT THE INVENTION

Referring to FIGS. 1 and 2, an embdiment of the test cap 10 of the invention is shown. The test cap is designed to seal off a duct 12 attached to an environmental control system component, such as a heat exchanger (not shown). The duct, which is typically constructed of aluminum, has a generally straight cross-sectional profile 14 with an inwardly tapering end portion 16. The inwardly tapering end portion allows a flexible duct connector (not shown), which is known in the art for connecting adjacent ducts, to be mounted on the duct without damage to a flexible duct connector o-ring (not shown). One of ordinary skill in the art will readily appreciate that the test cap described herein may have use with ducts or components other than those used for environmental control system components.

The pressure test cap 10 has several major components including; a knob 18, a nut 20, a segmented collet 22, and a sealing cap 24.

The knob is generally screw-shaped having a head portion 26, a neck portion 28, a threaded portion 30, and an end portion 32. The end portion has an annular groove 34 which holds a retention clip 36. The retention clip prevents a washer 38, which is fitted on the end portion 32, from sliding off the knob. The knob has a longitudinally extending hollow interior 40. The hollow interior is designed to communicate a fluid, which may or may not be pressurized depending on the test required, into the interior of the duct to test the component. The hollow interior has a threaded end portion 42 that is designed to cooperate with a threaded end of a test supply line (not shown). The threaded end portion may be sealed by a screw-in plug (not shown) if the fluid is introduced into the component for testing through another duct or opening (not shown).

The nut 20 has an threaded interior portion 44 which cooperates with the threaded portion 30 of the knob 18. The nut has an outer cam surface 46 which tapers radially inwardly from its left side to its right side. The nut has a longitudinal groove 48 for receiving an anti-rotation pin 50, as will be discussed infra.

The collet 22 is comprised of four sections. Each section has a body portion 52, a semi-annular groove 54 within the body portion, and a flange section 56 which extends radially outwardly from the body portion. The body portion has an inner surface 58 which tapers inwardly from its right side to its left side for cooperating with the cam surface 46 of the nut 20. The groove holds a retention ring 60 as will be discussed infra. Such rings are generally made of an elastic type material such as rubber. The flange has a flat outer surface 62 connected to a tapered outer surface 64 for cooperating with the generally straight cross-sectional profile 14 and the tapered end portion 16 of the duct respectively. The anti-rotation pin 50 fits between a pair of the sections.

The sealing cap 24 has a flange 66 which extends radially inwardly to cooperate with the neck 28 of the knob 18. The flange has an annular groove 68 for receiving a first sealing ring 70. The first sealing ring seals between the knob and the sealing cap. The flange has an hole 72 for anchoring the anti-rotation pin 50. The sealing cap has an flat interior surface 74 and a tapered interior surface 76 for cooperating with the generally straight cross-sectional profile 14 and the tapered end portion 16 of the duct 12. The flat interior surface has an annular groove 78 disposed therein for holding a second sealing ring 80. The second sealing ring seals between the duct and the sealing cap. A washer 82 is disposed between the knob 18 and the sealing cap 24 to provide against excessive wear on either component.

During operation, the knob 18 of the test cap is rotated in a first direction. The nut 20, which is held from rotating with the knob by the anti-rotation pin 50, translates along the threaded portion 30 of the knob towards the left until it abuts the washer 38. The cam surface 46 of the nut and the inner surfaces 58 of the collet 22 slide apart. The retention ring 60 urges the collet sections radially inwardly. The sealing cap 24 is then placed about the duct 12 until the tapered portion 16 abuts the tapered portion 76 of the sealing cap. The flat inner portion 74 of the sealing cap is dimensioned so that the second sealing ring 80 forms an interference fit with the duct thereby sealing the duct. Similarly to the flexible duct connector (not shown and as described above), the tapered portion 16 of the duct allows the second sealing ring of the sealing cap to be slipped over the end of the duct without concern that the end of the duct will damage the second sealing ring.

The knob is then rotated in a second direction translating the nut along the threaded portion towards the right. The cam surface 46 of the nut cooperates with the inner surfaces 58 of the collet thereby forcing the collet sections radially outwardly until the flat surface 62 and tapered surface 64 of the flange 56 engage the straight cross-sectional profile 14 and tapered portion 16 of the duct. An operator may then attach a test supply line to the threaded portion 42 of the hollow interior 40 to allow for testing. After testing is complete, the knob is rotated in the first direction to move the nut to the left. The cam surface of the nut and the inner surface of the collet slide apart and the retention ring urges the collet sections radially inwardly. The test cap may then be removed without interference from the tapered portion of the duct.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. Apparatus for sealing a duct, said duct having a shaped end portion, said apparatus being characterized by;

a sealing cap for enclosing and sealing said shaped end portion and having a portion conforming to the shape of said shaped end portion, an expansible collet for disposal within said shaped end portion of said duct, said collet having an outer surface conforming with the shape of said shaped end portion, and actuating means extending through said sealing cap and engaging said expansible collet for expanding said collet radially outwardly to engage said shaped end portion between said outer surface of said collet and said portion of said sealing cap such that said duct is sealed by said sealing cap, and for contracting said collet radially inwardly so that said sealing cap and expansible collet may be either removed or mounted upon said duct as may be required, said actuating means comprising;

a screw having a portion disposed outside of said sealing cap and a threaded portion disposed within an interior portion of said duct, a nut disposed upon said threaded portion within said interior portion of said duct for longitudinal movement thereupon and having a cammed outer surface for cooperating with said collet such that longitudinal movement of said nut in a first direction expands said collet radially outwardly and longitudinal movement of said nut in a second direction contracts said collet radially inwardly.

2. The apparatus of claim 1 further characterized by an anti-rotation pin extending into said duct from said sealing cap and cooperating with said nut to prevent said nut from rotating with said screw.

3. The apparatus of claim 1 wherein said collet is further characterized as having a first exterior section cooperating with an interior portion of said duct and a second exterior section cooperating with said radially inwardly shaped end portion.

4. Apparatus of claim 1 further characterized by means extending through said sealing cap for admitting a supply of fluid to an interior of said duct.

5. Apparatus of claim 4 wherein said means extending through said sealing cap is characterized by an hollow interior portion of said screw.

6. Apparatus of claim 1 wherein said collet is further characterized by a tapered inner surface which cooperates with said cammed surface such that said expanding and contracting of said collet is facilitated.

7. Apparatus for sealing a duct, said duct having a radially inwardly shaped end portion, said apparatus being characterized by;

a sealing cap for enclosing and sealing said shaped end portion and having a portion conforming to the shape of said shaped end portion, an expansible collet for disposal within said shaped end portion of said duct, said collet having an outer surface conforming with the shape of said shaped end portion, and actuating means extending through said sealing cap and engaging said expansible collet for expanding said collet radially outwardly to engage said shaped end portion between said outer surface of said collet and said portion of said sealing cap such that said duct is sealed by said sealing cap, and for contracting said collet radially inwardly so that said sealing cap and expansible collet may be either removed or mounted upon said duct as may be required, said actuating means comprising;

a screw having a portion disposed outside of said sealing cap and a threaded portion disposed within an interior portion of said duct, a nut disposed upon said threaded portion within said interior portion of said duct for longitudinal movement thereupon and having a cammed outer surface for cooperating with said collet such that longitudinal movement of said nut in a first direction expands said collet radially outwardly and longitudinal movement of said nut in a second direction contracts said collet radially inwardly.

8. The apparatus of claim 7 wherein said collet is further characterized as having a first exterior section cooperating with an interior portion of said said duct and a second exterior section cooperating with said radially inwardly shaped end portion.

9. The apparatus of claim 7 wherein said collet is further characterized as having a plurality of sections.

10. The apparatus of claim 7 further characterized by an anti-rotation pin extending into said duct from said sealing cap and cooperating with said nut to prevent said nut from rotating with said screw.

11. Apparatus of claim 7 further characterized by means extending through said sealing cap for admitting a supply of fluid to an interior of said duct.

12. Apparatus of claim 11 wherein said means extending through said sealing cap is characterized by an hollow interior portion of said screw.

13. Apparatus of claim 7 wherein said collet is further characterized by a tapered inner surface which cooperates with said cammed surface such that said expanding and contracting of said collet is facilitated.

* * * * *